(12) United States Patent
Cysewski et al.

(10) Patent No.: US 10,532,536 B2
(45) Date of Patent: Jan. 14, 2020

(54) REUSABLE COVERING FOR PROTECTING A FINISHED SURFACE

(71) Applicant: The Boeing Company, Chicago, IL (US)

(72) Inventors: Sean Richard Cysewski, Snohomish, WA (US); Nicholas Van Den Handel, Everett, WA (US)

(73) Assignee: The Boeing Company, Chicago, IL (US)

( * ) Notice: Subject to any disclaimer, the term of this patent is extended or adjusted under 35 U.S.C. 154(b) by 87 days.

(21) Appl. No.: 15/683,160

(22) Filed: Aug. 22, 2017

(65) Prior Publication Data

US 2019/0061306 A1    Feb. 28, 2019

(51) Int. Cl.
| | |
|---|---|
| *B32B 3/26* | (2006.01) |
| *B32B 7/12* | (2006.01) |
| *B64C 1/06* | (2006.01) |
| *B32B 38/10* | (2006.01) |
| *B64D 11/00* | (2006.01) |
| *B64D 11/02* | (2006.01) |
| *B64D 11/04* | (2006.01) |

(52) U.S. Cl.
CPC ............... *B32B 3/266* (2013.01); *B32B 7/12* (2013.01); *B64C 1/066* (2013.01); *B32B 38/10* (2013.01); *B32B 2309/105* (2013.01); *B32B 2605/18* (2013.01); *B64D 11/0023* (2013.01); *B64D 11/02* (2013.01); *B64D 11/04* (2013.01); *B64D 2011/0076* (2013.01)

(58) Field of Classification Search
CPC ...................................................... B32B 3/266
USPC ................................................................ 428/43
See application file for complete search history.

(56) References Cited

U.S. PATENT DOCUMENTS

| | | | | |
|---|---|---|---|---|
| 2,331,086 | A * | 10/1943 | Taylor ....................... | G09F 3/20 40/618 |
| 6,238,762 | B1 | 5/2001 | Friedland et al. | |
| 9,248,314 | B2 | 2/2016 | Calkins | |
| 2012/0183715 | A1* | 7/2012 | Calkins ................... | B32B 3/266 428/43 |
| 2013/0236691 | A1 | 9/2013 | Calkins | |

FOREIGN PATENT DOCUMENTS

CA          2 432 813       12/2003

\* cited by examiner

*Primary Examiner* — Brent T O'Hern
(74) *Attorney, Agent, or Firm* — Vivacqua Law

(57) ABSTRACT

A panel assembly is disclosed, and includes at least one panel that defines a finished surface and a covering that is removeably adhered to the finished surface of the panel. The covering includes a plurality of patch sections that are defined by lines of demarcation, and each of the plurality of patch sections are frangible with respect to adjacent patch sections at the lines of demarcation.

20 Claims, 5 Drawing Sheets

REUSABLE COVERING FOR PROTECTING A FINISHED SURFACE

FIELD

The disclosed system and method relate to a panel assembly having a reusable protective covering and, more particularly, to a panel having a finished surface and a covering that is removeably adhered to the finished surface of the panel.

BACKGROUND

Storage or compartment structures are often installed on commercial passenger aircraft. These storage and compartment structures may also be referred to as monuments. Monuments may include various types of structures within an aircraft such as, for example, closets, partitions, sleeping quarters for cabin crew, lavatories, and galleys for providing in-flight catering meal service to passengers. Traditionally, during shipping, installation, and other operations the exterior surfaces of the monuments have been protected from scratches and dents using bulky foam pads covered by tarp.

The tarp-covered foam pads are usually heavy and rigid, and may be challenging to accommodate in a manufacturing environment. Therefore, in order to limit use, the foam pads may only cover finished surfaces of the monument, and any unfinished surfaces of the monument are left exposed. Even when the foam pads are placed on finished surfaces, the pads are rigid and do not ordinarily conform to the exterior contour of the finished surface. Furthermore, at least a portion of the foam pad is removed during installation to perform various operations. For example, a foam pad may be removed to install a display screen. The foam pads may be releasably secured to the monument by fastening products such as fabric hook and loop fasteners. Removing the entire foam pad also results in the entire exterior surface of the monument exposed, thereby making the exterior surface more susceptible to scratches and dents. Indeed, an exposed surface of the monument may be scratched or dented if objects such as tooling make impact with the exposed surface of the monument. This issue may become even more problematic if the monument includes delicate surfaces that are even easier to scratch or dent.

SUMMARY

A reusable covering is releasably adhered to a finished surface of a panel by a low-tack adhesive. The covering includes a plurality of patch sections that are defined by lines of demarcation in the covering. The patch sections are removable along the lines of demarcation. Therefore, one or more patch sections may be removed from the covering along the lines of demarcation to create an opening where the finished surface of the panel is exposed. An operator may then perform work on the exposed portion finished surface of the panel, while the portion of the panel that remains covered remains protected from the environment. The patch section previously removed from the covering is reusable. Thus, once the operator is finished performing work upon the exposed portion of the finished surface, the patch sections that were previously removed may be reapplied to the finished surface of the panel. The low-tack adhesive allows for the patch sections to be repeatedly applied to and removed from the finished surface of the panel.

In one example, a panel assembly is disclosed, and includes at least one panel that defines a finished surface and a covering that is removeably adhered to the finished surface of the panel. The covering includes a plurality of patch sections that are defined by lines of demarcation, and each of the plurality of patch sections are frangible with respect to adjacent patch sections at the lines of demarcation.

In another example, a method for manufacturing a panel assembly is disclosed. The method includes receiving the panel assembly. The panel assembly includes at least one panel defining a finished surface and a covering that is removeably adhered to the finished surface of the panel. The covering includes a plurality of patch sections that are defined by lines of demarcation. The method also includes removing at least patch section from the finished surface of the panel to create an opening by tearing at least one of the patch sections along the lines of demarcation. Each patch section is frangible at the lines of demarcation.

In yet another example, a method for removing a covering from a finished surface of a panel is disclosed. The covering is removeably adhered to the finished surface of the panel. The method includes peeling a corner of a patch section of the covering away from the finished surface of the panel. The covering includes a plurality of patch sections that are defined by lines of demarcation. The patch sections are frangible with respect to adjacent patch sections at the lines of demarcation. The method also includes tearing the patch section of the covering apart from the adjacent patch sections at the lines of demarcation of the covering. Finally, the method includes removing at least the patch section of the covering from the finished surface of the panel.

Other objects and advantages of the disclosed method and system will be apparent from the following description, the accompanying drawings and the appended claims.

DETAILED DESCRIPTION

Figure 1:
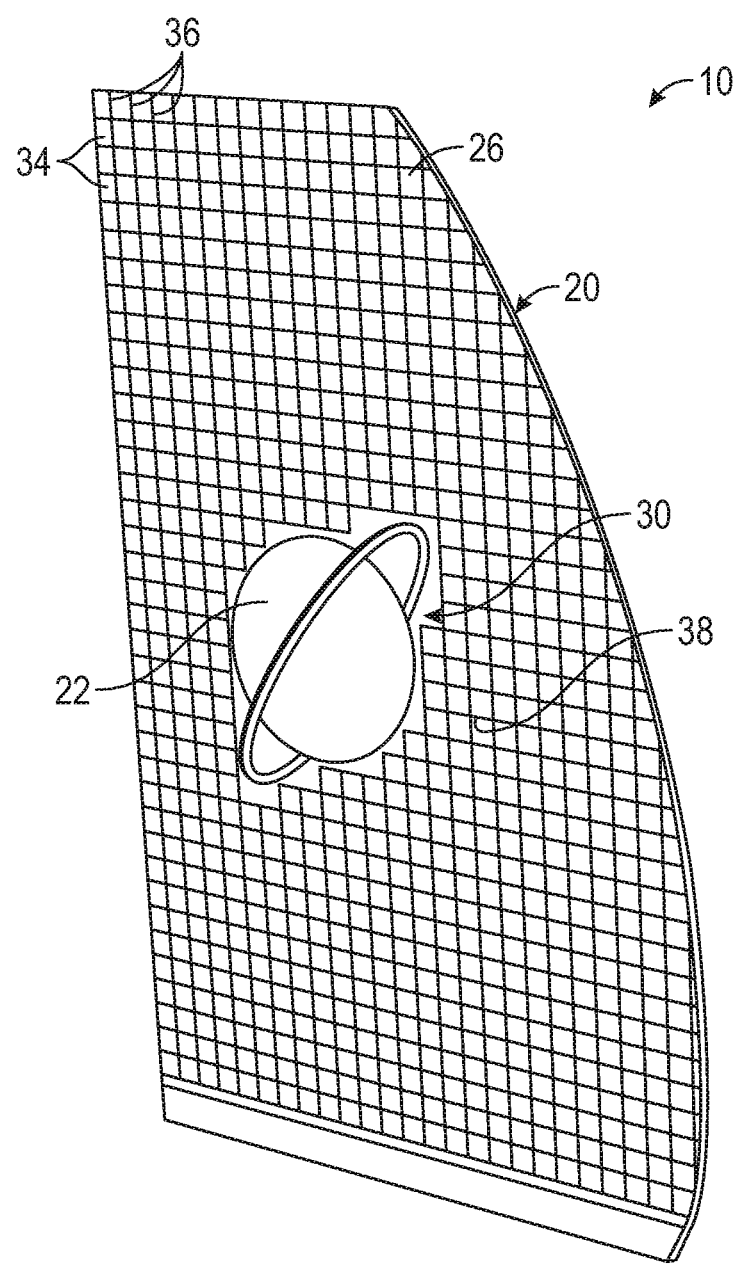
FIG. 1 is an illustration of an exemplary panel assembly including a panel, a finished surface, and a covering, where the covering has been partially removed along lines of demarcation to create an irregularly shaped opening.

FIG. 1 is an exemplary panel assembly 10, where the panel assembly 10 includes at least one panel 20. The panel 20 includes at least one finished surface 22. The panel assembly 10 also includes a covering 26 removeably adhered to the finished surface 22 of the panel 20. In the embodiment as shown in FIG. 1, a portion of the covering 26 is removed in order to expose a logo 30 that is painted on, embossed in, and/or coupled to the finished surface 22. Although a logo 30 is illustrated, other objects may be painted or embossed along the finished surface 22 as well. For example, lettering, numbering, or any type of pattern may be embossed or painted along the finished surface 22. As explained below, the covering 26 protects the finished surface 22 of the panel 20 during shipping and installation of the panel 20. The covering 26 is also reusable, and may be applied and removed from the finished surface 22, or from another surface, multiple times.

In one embodiment, the panel assembly 10 is a monument for an aircraft. Some examples of monuments for an aircraft include, but are not limited to, closets, partitions, sleeping quarters for cabin crew, lavatories, and galleys. However, the present disclosure is not limited to aircraft applications. In fact, the disclosed panel assembly 10 may be used in a variety of other applications as well such as, for example, automotive body panels. In one embodiment, the panel 20 is a laminated panel having a foam core. That is, the panel 20 is constructed of sheets of substrates surrounding a foam core, and a protective layer is applied to at least one of the sides of the panel 20. In one embodiment, the finished surface 22 represents either a laminate or a painted surface of the panel 20.

Figure 2:
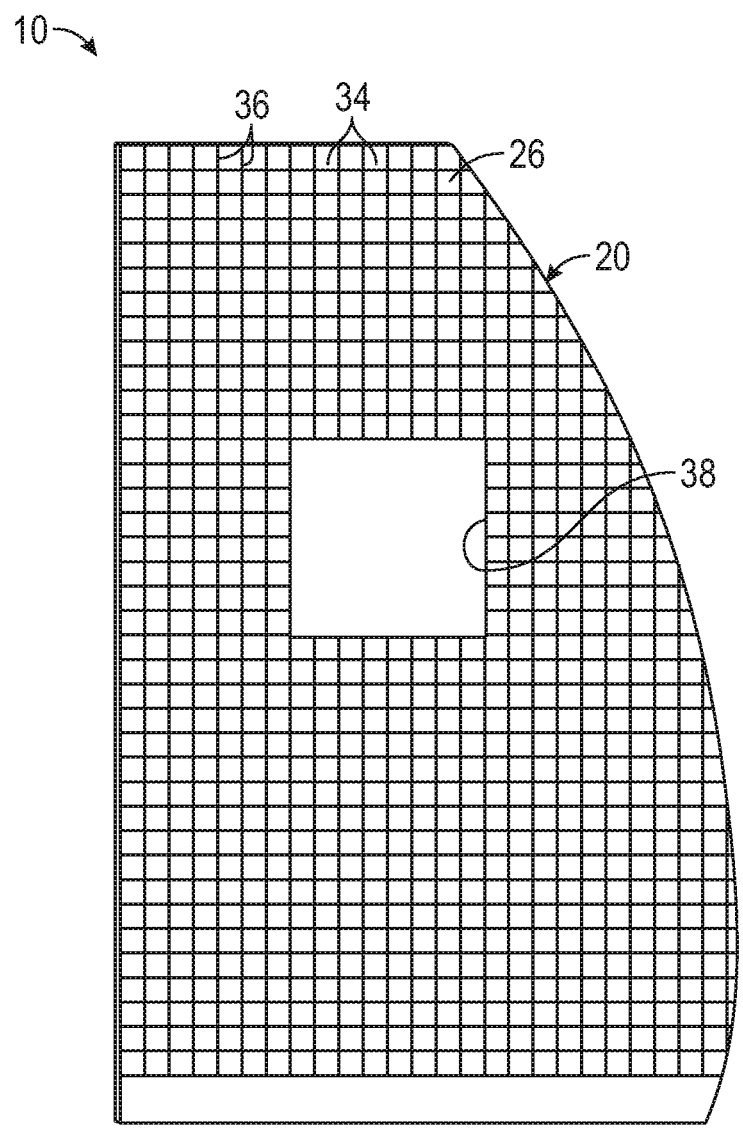
FIG. 2 is another illustration of a panel assembly, where the covering has been partially removed to create a square opening.

Continuing to refer to FIG. 1, the covering 26 includes a plurality of patch sections 34 defined by lines of demarcation 36. That is, the covering 26 is sectioned or divided into separate patch sections 34. As seen in FIG. 1, a portion of the patch sections 34 have been removed from the finished surface 22 to create an opening 38 that exposes the portion of the finished surface where a feature, such as the logo 30, display screen, or trim, will be or is located. Although the opening 38 shown in FIG. 1 is an irregular polygon, the opening 38 may include any number of shapes and profiles. For example, in the embodiment as shown in FIG. 2 the opening 38 is square-shaped. Moreover, more than one opening 38 may be created by removing the patch sections 34 from the finished surface 22 of the panel 20. As seen in FIGS. 1 and 2, the lines of demarcation 36 of the covering 26 are arranged in a grid pattern. That is, the lines of demarcation 36 intersect with one another in order to create a grid of uniformly-shaped patch sections 34. In the example as shown, the patch sections 34 are each shaped as squares. In one non-limiting embodiment, each square includes dimensions of about 2×2 inches (5.08×5.08 centimeters). In another embodiment, the minimum dimension of each square is about 1×1 inches (2.58×2.58 centimeters). However, as explained below, the patch sections 34 may include a variety of shapes and profiles.

Figure 3:
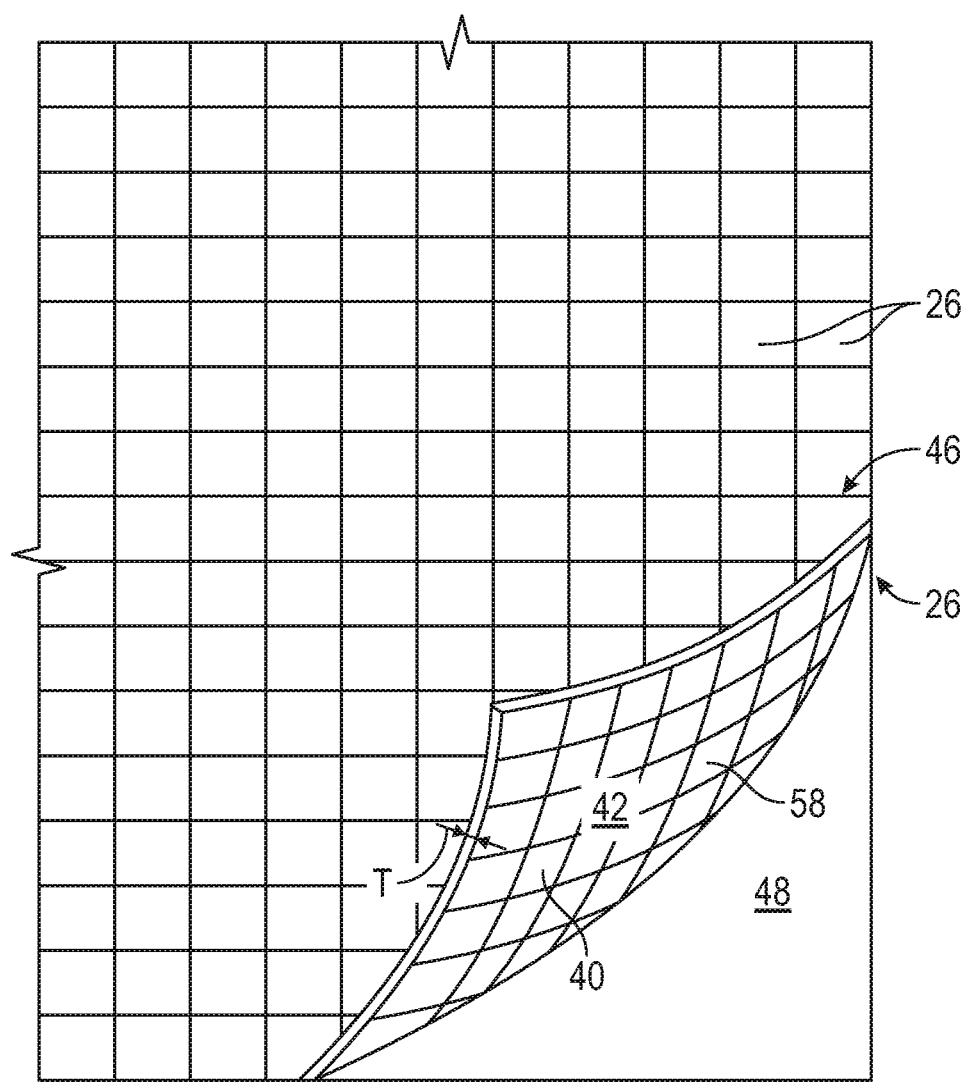
FIG. 3 is an enlarged view of a portion of the covering shown in FIG. 1.

FIG. 3 is an exemplary illustration of the covering 26 being lifted away from a backing or release paper 48. As explained below, the covering 26 may be delivered in a variety of forms, and the embodiment shown in FIG. 3 is not limiting in nature. For example, the covering 26 can be delivered as a sheet or a roll. Continuing to refer to FIG. 3, the plurality of patch sections 34 of the covering 26 each define an outer peripheral shape 46. For example, in the embodiment as shown the outer peripheral shape 46 is a square. Furthermore, the outer peripheral shape 46 of the patch sections 34 shown in FIG. 3 are identical to one another. However, in another embodiment, the outer peripheral shape 46 of the patch sections 34 are symmetrical polygons that include matching sides when divided along a line of symmetry. Some examples of conventional polygons include, for example, squares, rectangles, triangles, or hexagons. In yet another embodiment, the outer peripheral shape 46 of the patch sections 34 are non-symmetrical polygons, and may also be referred to as customized shapes. For example, in one embodiment the outer peripheral shape 46 of the patch sections 34 may be L-shaped. That is, the patch sections 34 include two legs or projections of equal width that are joined at respective end portions, and are substantially perpendicular to one another, thereby resembling the letter L.

Referring to both FIGS. 1 and 2, each of the patch sections 34 are frangible with respect to adjacent patch sections 34 at the lines of demarcation 36 of the covering 26. That is, the lines of demarcation 36 represent lines of weakness where a user may separate or tear two adjacent patch sections 34 apart from one another. Accordingly, each patch section 34 is configured to be removed individually from the covering 26. Turning now to FIG. 3, the covering 26 defines opposing surfaces, such as a back surface 42 and a front surface 44, where a low-tack adhesive 40 substantially covers one of the opposing surfaces, such as the back surface 42, to create an adhesive side 58. The surface 42 of the covering 26 is temporarily adhered to the release paper 48.

The lines of demarcation 36 of the covering 26 are lines of perforations that extend through a thickness T of the covering 26. In one embodiment, the perforations also extend through a low-tack adhesive 40 that covers one of the opposing surfaces 42 of the covering 26. The perforations may include features such as holes, slits, slices, or openings (not visible in the figures) that extend through at least the thickness T of the covering 26 and the low-tack adhesive 40. In one embodiment, the lines of demarcation 36 may extend not only through the covering 26 and the low-tack adhesive 40, but through the release paper 48 as well. Although FIG. 3 illustrates the entire covering 26 including the grid pattern, in another embodiment only a portion of the covering 26 is divided into the patch sections 34 and include the grid pattern.

The covering 26 is temporarily adhered to the release paper 48 by the low-tack adhesive 40. Specifically, the covering 26 is temporarily adhered to the release paper 48 along the back surface 42, which is covered by the low-tack adhesive 40. As seen in FIG. 3, the covering 26 is being peeled or lifted off of the release paper 48. The covering 26 is usually peeled away from the release paper 48 immediately before the covering 26 is applied to the finished surface 22 of the panel 20 (shown in FIG. 1).

Referring to both FIGS. 1 and 3, the adhesive side 58 of the covering 26 is removeably adhered to the finished surface 22 of the panel 20. The adhesive side 58 is configured to be repeatedly applied to and removed from the finished surface 22 of the panel 20. Alternatively, the adhesive side 58 of the covering 26 may be removed from the panel 20 and placed upon another finished surface of a different panel assembly (not shown). In other words, the adhesive side 58 allows for the patch sections 34 to be applied and removed from a surface and reused multiple times. One commercial example of a low-tack adhesive that may be used is a removable/repositionable label adhesive product available from Bostik Incorporated of Wauwatosa, Wis.

Continuing to refer to FIGS. 1 and 3, the covering 26 is constructed of plastic and is sufficiently flexible so as to conform to a contour defined by the finished surface 22 of the panel 20. In other words, the covering 26 is malleable or pliant enough so as to conform to various contours or curved profiles defined by the finished surface 22 of the panel 20. Some examples of sufficiently flexible plastics that may be used include, but are not limited to, polyvinyl chloride (PVC), ultra-high-molecular-weight polyethylene (UHMWPE), high-density polyethylene (HDPE), low-density polyethylene (LDPE), acrylonitrile butadiene styrene (ABS), cellulose acetate butyrate (CAB), polystyrene (PS), thermoplastic acrylic-polyvinyl chloride materials, polycarbonates (PC), polyvinylidene difluoride (PVDF), and thermoplastic elastomers (TPE). In one example, the covering 26 is substantially transparent such that a user is able to see the finished surface 22 of panel 20 through the covering 26. Alternatively, in another embodiment the covering 26 is translucent or opaque instead.

The covering 26 is sufficiently thick so as to provide protection to the finished surface 22 of the panel 20 from a majority of scratches, dents, or punctures that might occur during shipping and installation of the panel assembly 10. Referring to FIG. 3, the covering 26 defines the thickness T, which ranges from about 0.02 inches (0.0508 centimeters) to about 0.1 inches (0.254 centimeters), which is the thickness that substantially protects the finished surface 22 of the panel 20 from dents or punctures during manufacture and assembly. In other words, the covering 26 provides impact resistance to the finished surface 22 of the panel 20.

FIG. 3 illustrates the covering 26 and the low-tack adhesive 40 together. In another embodiment, the covering 26 and the low-tack adhesive 40 are applied to the finished surface 22 of the panel 20 separately. Referring to FIGS. 1, 2, and 3, in one embodiment the covering 26 is manufactured by first creating perforations through the thickness T of the covering 26 to define the lines of demarcation 36. The covering 26 is delivered in a roll, without the low-tack adhesive 40. The low-tack adhesive 40 is first applied to the finished surface 22 of the panel 20, and then the covering 26 is unrolled onto the finished surface 22 of the panel 20. Thus, the lines of demarcation 36 only extend through the covering 26, and not the low-tack adhesive 40.

Alternatively, in another embodiment, the low-tack adhesive 40 is first applied to the covering 26, and then the perforations are created to create the lines of demarcation 36. Thus, the perforations extend though not only the thickness T of the covering 26, but also the low-tack adhesive 40. In still another embodiment, the perforations are created once the covering 26 is mounted upon the release paper 48. Thus, the perforations extend not only through the covering 26 and the low-tack adhesive 40, but the release paper 48 as well.

Figure 4A:
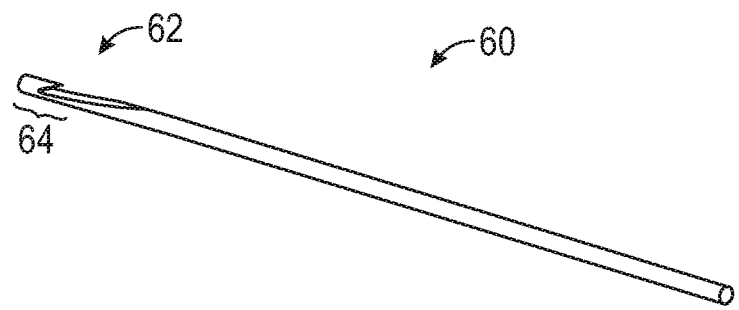
FIG. 4A illustrates a removal tool for lifting the covering from the finished surface of the panel shown in FIG. 1.
Figure 4B:
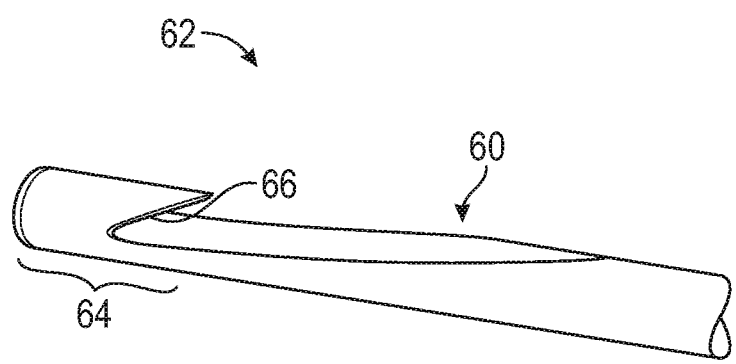
FIG. 4B is an enlarged view of a distal end of the removal tool shown in FIG. 4A.

FIGS. 4A and 4B illustrate a removal tool 60 that an operator may use in order to remove the patch sections 34 of the covering 26 from the finished surface 22 of the panel 20 (FIG. 1). Referring to FIG. 4A, the removal tool 60 defines a distal end 62. The distal end 62 of the removal tool 60 is used to urge or pry the patch sections 34 of the covering 26 away from the finished surface 22 of the panel 20. The distal end 62 of the removal tool 60 terminates at a hook portion 64. In the example as illustrated, the hook portion 64 of the removal tool 60 includes a profile that is similar to or resembles a crochet hook. FIG. 4B is an enlarged view of the hook portion 64 of the removal tool 60. The hook portion 64 represents a portion of the removal tool 60 that is curved or bent back into an angle. The hook portion 64 defines an angled surface 66 that is used for catching hold of or hanging onto a portion of one of the patch sections 34 of the covering 26. Thus, the removal tool 60 allows for an operator to easily grasp and remove one or more patch sections 34 of the covering 26.

Figure 5:
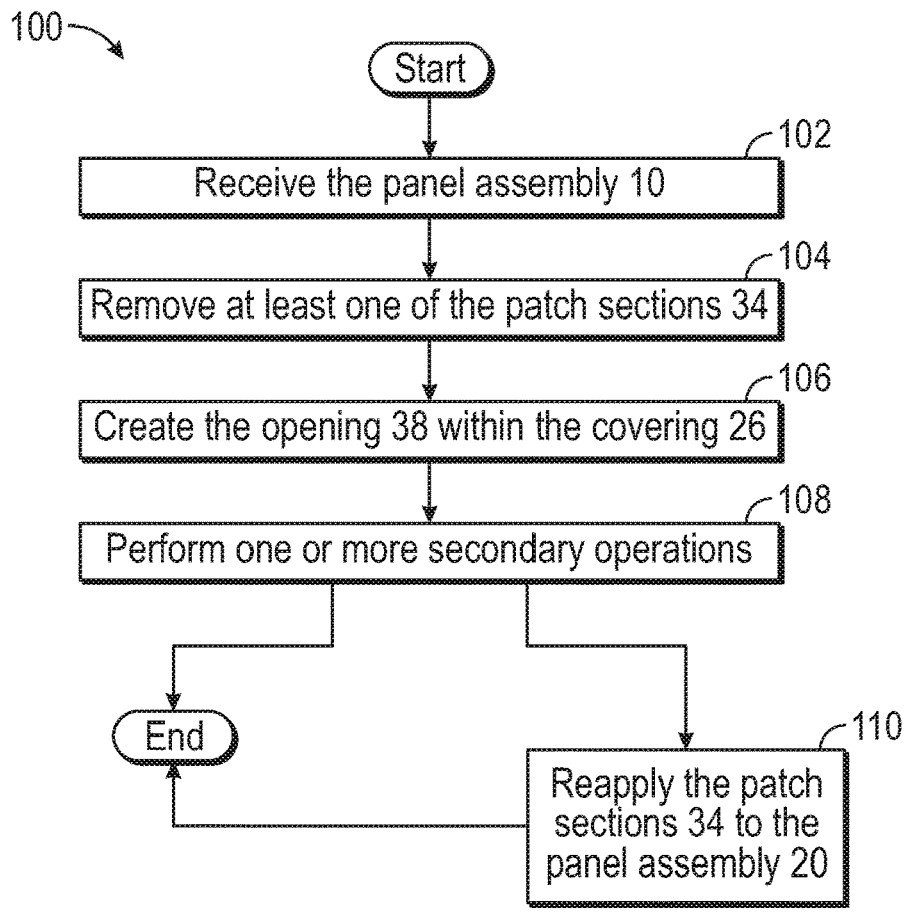
FIG. 5 is an exemplary process flow diagram of a method for manufacturing the panel assembly shown in FIG. 1.

FIG. 5 is an exemplary process flow diagram illustrating a method 100 for manufacturing the panel assembly 10 shown in FIG. 1. Referring now to FIGS. 1, 4A-4B, and 5, the method 100 begins at block 102. In block 102, the panel assembly 10 is received. As mentioned above, the panel assembly 10 includes at least one panel 20 including the finished surface 22 and the covering 26 that is removeably adhered to the finished surface 22 of the panel 20. The covering 26 includes the patch sections 34 that are defined by the lines of demarcation 36. The method 100 may then proceed to block 104.

In block 104, at least one patch section 34 is removed from the finished surface 22 of the panel 20 to create the opening 38 by tearing the patch section 34 along the lines of demarcation 36. As mentioned above, each of the plurality of patch sections 34 are frangible at the lines of demarcation 36.

In one embodiment, the patch section 34 is removed by the removal tool 60 shown in FIGS. 4A and 4B. Referring now to both FIGS. 4B and 4C, a corner 70 of a single patch section 34 of the covering 26 is lifted from the finished surface 22 by placing the angled surface 66 defined by the hook portion 64 of the removal tool 60 underneath the covering 26, where placing the hook portion 64 of the removal tool urges the covering 26 away from the finished surface 22 of the panel 20. The method 100 may then proceed to block 106.

In block 106, the opening 38 within the covering 26 is created by removing a select number of patch sections 34 of the covering 26. In the embodiment as shown in FIG. 1, the opening 38 is irregularly shaped, and in the embodiment as shown in FIG. 2 the opening 38 is shaped as a square. The method 100 may then proceed to block 108.

In block 108, at least one secondary operation is performed within the opening 38 defined by the cover 26. Some examples of secondary operations include installing display screens, bump strips, trim, and miscellaneous decorative features, such as the logo 30 in FIG. 1. In one embodiment, the method 100 may then terminate. However, in an alternative embodiment the patch sections 34 are reapplied to the panel assembly 10. For example, if relatively expensive or delicate components such as display screens and decorative features are installed as part of the panel assembly 10, then the patch sections 34 are reapplied back onto the panel 20. The patch sections 34 are reapplied to protect the expensive features and components. Accordingly, the method 100 may then proceed to block 110.

In block 110, the patch sections 34 that were previously removed from the finished surface 22 of the panel 20 are reapplied back to the panel assembly 10. Method 100 may then terminate.

Figure 6:
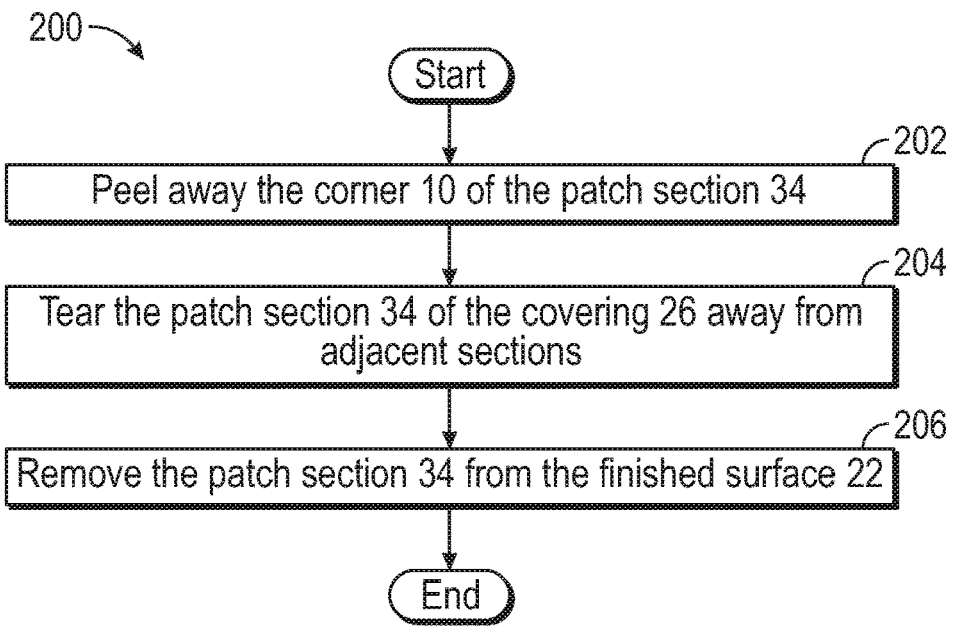
FIG. 6 is an exemplary process flow diagram of a method for removing a portion of the covering from the finished surface of the panel assembly shown in FIG. 1.

Turning now to FIG. 6, a method 200 for removing the covering 26 from the finished surface 22 of the panel 20 is disclosed. As mentioned above, the covering 26 is removeably adhered to the finished surface 22 of the panel 20. Referring now to FIGS. 1, 4A-4C, and 6, the method 200 begins at block 202. In block 202, the corner 70 of a patch section 34 (FIG. 4C) of the covering 26 is peeled away from the finished surface 22 of the panel 20. The covering 26 includes a plurality of patch sections 34 that are defined by the lines of demarcation 36. Moreover, the patch sections 34 are frangible with respect to adjacent patch sections 34 at the lines of demarcation 36.

Figure 4C:
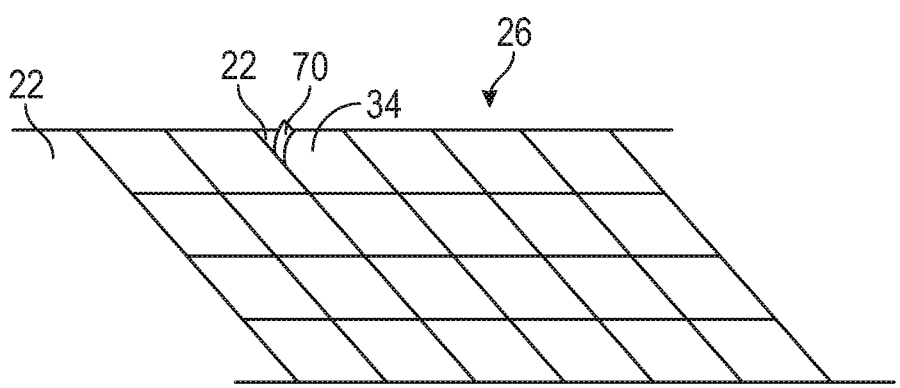
FIG. 4C illustrates a single patch section being removed from the finished surface of the panel.

In one approach, the corner 70 shown in FIG. 4C is peeled away from the finished surface 22 of the panel 20 by the removal tool 60 shown in FIGS. 4A and 4B. Specifically, the corner 70 of the patch section 34 seen in FIG. 4C is peeled away by placing the angled surface 66 of the removal tool 60 between the adhesive side 58 of the covering 26 and the finished surface 22. Method 200 may then proceed to block 204.

In block 204, the patch section 34 of the covering 26 is torn apart from adjacent patch sections 34 at the lines of demarcation 36 of the covering 26. The method 200 may then proceed to block 206.

In block 206, at least the patch section 34 of the covering 26 being peeled away is removed from the finished surface 22 of the panel 20. The method 200 may then terminate.

Referring generally to the figures, the disclosure describes a reusable covering that protects the panel assembly throughout the entire assembly process. The covering is adaptable and may be for various monuments and models used in an aircraft. The covering is divided into a plurality of patch sections that are frangible with respect to one another. Thus, a portion of the covering may be removed at some time during assembly to allow for an operator to perform a secondary operation, such as installing a display or other feature to the panel assembly. The portion of the covering that was removed may then be placed back upon the panel assembly. Thus, unlike the bulky foam pads that are currently being used, only a portion of the covering is removed during assembly to perform secondary operations. Accordingly, a majority of the panel assembly is still substantially protected from dents, scratches, and punctures that may be created by blunt and sharp objects.

In addition to the above-mentioned technical effects and benefits, in one approach, the covering may be removed as late as during flightline delivery. Finally, the covering include lines of demarcation that represent lines of weakness in the covering. Thus, the covering may be placed around a doorway, where the lines of demarcation are aligned with the opening of the doorway. Accordingly, mechanics and other personnel may be able to open doors of galleys, closets, and other monuments without first removing the covering since the doors may open around the lines of demarcation.

While the forms of apparatus and methods herein described constitute preferred examples of this invention, it is to be understood that the invention is not limited to these precise forms of apparatus and methods, and the changes may be made therein without departing from the scope of the invention.

What is claimed is:

1. A panel assembly, comprising:
   at least one panel, wherein the at least one panel includes a finished surface;
   one or more objects disposed on the finished surface of the at least one panel, wherein the one or more objects are at least one of painted, embossed, or coupled to the finished surface of the at least one panel; and
   a covering removably adhered to the finished surface of the at least one panel, wherein the covering includes a plurality of patch sections that are defined by lines of demarcation, and each of the plurality of patch sections are frangible with respect to adjacent patch sections at the lines of demarcation, and wherein the covering defines opposing surfaces and a low-tack adhesive substantially covers one of the opposing surfaces to create an adhesive surface that is configured for repeated application and removal from the at least one panel.

2. The panel assembly of claim 1, wherein the adhesive surface of the covering is removably adhered to the finished surface of the at least one panel.

3. The panel assembly of claim 1, wherein the lines of demarcation of the covering are lines of perforations that extend through a thickness of the covering and the low-tack adhesive.

4. The panel assembly of claim 1, wherein the covering defines a thickness ranging from about 0.02 inches to about 0.1 inches.

5. The panel assembly of claim 1, wherein the covering is constructed of plastic and is sufficiently flexible so as to conform to a contour defined by the finished surface of the at least one panel.

6. The panel assembly of claim 1, wherein the plurality of patch sections each define an outer peripheral shape, and the outer peripheral shape of the plurality of patch sections are identical to one another.

7. The panel assembly of claim 5, wherein the outer peripheral shape of the plurality of patch sections are symmetrical polygons.

8. The panel assembly of claim 5, wherein an outer peripheral shape of the plurality of patch sections are non-symmetrical polygons.

9. The panel assembly of claim 1, wherein the lines of demarcation of the covering are arranged in a grid pattern.

10. The panel assembly of claim 1, wherein the finished surface is either a laminate or a painted surface.

11. The panel assembly of claim 1, wherein the panel assembly is a monument for an aircraft.

12. The panel assembly of claim 1, wherein the one or more objects include at least one of the following: lettering, numbering, and a pattern.

13. A panel assembly, comprising:
    at least one panel, wherein the at least one panel includes a finished surface;
    one or more objects disposed on the finished surface of the at least one panel, wherein the one or more objects are at least one of painted, embossed, or coupled to the finished surface of the at least one panel; and
    a covering removably adhered to the finished surface of the at least one panel, wherein the covering includes a plurality of patch sections that are defined by lines of demarcation, and each of the plurality of patch sections are frangible with respect to adjacent patch sections at the lines of demarcation, and wherein the covering defines opposing surfaces and a low-tack adhesive substantially covers one of the opposing surfaces to create an adhesive surface that is configured for repeated application and removal from the at least one panel, and wherein the adhesive surface of the covering is removably adhered to the finished surface of the at least one panel.

14. The panel assembly of claim 13, wherein the lines of demarcation of the covering are lines of perforations that extend through a thickness of the covering and the low-tack adhesive.

15. The panel assembly of claim 13, wherein the covering defines a thickness ranging from about 0.02 inches to about 0.1 inches.

16. The panel assembly of claim 13, wherein the covering is constructed of plastic and is sufficiently flexible so as to conform to a contour defined by the finished surface of the at least one panel.

17. The panel assembly of claim 13, wherein the plurality of patch sections each define an outer peripheral shape, and the outer peripheral shape of the plurality of patch sections are identical to one another.

18. The panel assembly of claim 17, wherein the outer peripheral shape of the plurality of patch sections are symmetrical polygons.

19. The panel assembly of claim 17, wherein an outer peripheral shape of the plurality of patch sections are non-symmetrical polygons.

20. The panel assembly of claim 13, wherein the lines of demarcation of the covering are arranged in a grid pattern.

* * * * *